United States Patent
Shalom et al.

(10) Patent No.: US 12,038,922 B2
(45) Date of Patent: Jul. 16, 2024

(54) PIPELINED HARDWARE-IMPLEMENTED DATABASE QUERY PROCESSING

(71) Applicant: SPEEDATA LTD., Haifa (IL)

(72) Inventors: Rafi Shalom, Petah Tikva (IL); Kobby Carmona, Hod Hasharon (IL)

(73) Assignee: SPEEDATA LTD., Haifa (IL)

( * ) Notice: Subject to any disclaimer, the term of this patent is extended or adjusted under 35 U.S.C. 154(b) by 222 days.

(21) Appl. No.: 17/503,320

(22) Filed: Oct. 17, 2021

(65) Prior Publication Data

US 2023/0120492 A1 Apr. 20, 2023

(51) Int. Cl.
*G06F 16/2453* (2019.01)
*G06F 16/22* (2019.01)

(52) U.S. Cl.
CPC .... *G06F 16/24537* (2019.01); *G06F 16/2282* (2019.01)

(58) Field of Classification Search
CPC .................................................. G06F 16/24537
USPC ........................................................ 707/714
See application file for complete search history.

(56) References Cited

U.S. PATENT DOCUMENTS

| | | | | |
|---|---|---|---|---|
| 6,028,936 | A * | 2/2000 | Hillis | G11B 20/00695 713/168 |
| 6,226,634 | B1 * | 5/2001 | Ogihara | G06F 16/9014 |
| 7,310,638 | B1 * | 12/2007 | Blair | G06F 16/24568 |
| 8,832,157 | B1 * | 9/2014 | Shatdal | G06F 16/24545 707/802 |
| 10,579,390 | B2 | 3/2020 | Etsion et al. | |
| 11,175,922 | B1 | 11/2021 | Etsion et al. | |
| 2004/0186832 | A1 * | 9/2004 | Jardin | G06F 16/27 |
| 2008/0215853 | A1 * | 9/2008 | Lane | H04L 49/3009 712/205 |
| 2013/0024621 | A1 * | 1/2013 | Choi | G06F 15/7871 711/149 |
| 2014/0115182 | A1 * | 4/2014 | Sabaa | H04L 67/1097 709/232 |
| 2016/0078031 | A1 | 3/2016 | Derby et al. | |
| 2017/0185648 | A1 * | 6/2017 | Kavulya | G06F 16/24554 |
| 2018/0081939 | A1 | 3/2018 | Hopeman et al. | |
| 2019/0258733 | A1 | 8/2019 | Brown | |
| 2020/0159539 | A1 | 5/2020 | Etsion et al. | |

(Continued)

OTHER PUBLICATIONS

Kirsch et al., "Hash-Based Techniques for High-Speed Packet Processing", pp. 1-40, published in book "Algorithms for Next Generation Networks", Springer-Verlag London, year 2010.

(Continued)

*Primary Examiner* — Muluemebet Gurmu
(74) *Attorney, Agent, or Firm* — KLIGLER & ASSOCIATES PATENT ATTORNEYS LTD.

(57) ABSTRACT

An apparatus for applying database commands to one or more database tables includes a memory and a hardware-implemented pipeline. The hardware-implemented pipeline includes one or more table-processing circuits, and is configured to receive a stream of input records drawn from the one or more database tables, to parse first records, from among the input records, into a key and one or more fields other than the key, to store at least parts of the first records in the memory so as to be accessible using the key, and to apply a database command by matching at least parts of second records from among the input records to the at least parts of the first records stored in the memory, in accordance with the key.

28 Claims, 5 Drawing Sheets

(56) References Cited

U.S. PATENT DOCUMENTS

2020/0401595 A1* 12/2020 Jagota ................ G06F 16/252
2021/0073231 A1*  3/2021 Chen ............... G06F 16/24544
2021/0089349 A1   3/2021 Etsion et al.
2021/0334134 A1  10/2021 Voitsechov et al.

OTHER PUBLICATIONS

Zink et al., "Efficient Hash-Tables for Network Applications", SpringerPlus Open Journal, pp. 1-19, May 15, 2015.
International Application # PCT/IB2022/056384 Search Report dated Dec. 26, 2022.

* cited by examiner

PIPELINED HARDWARE-IMPLEMENTED DATABASE QUERY PROCESSING

FIELD OF THE INVENTION

The present invention relates generally to digital hardware and microprocessor design, and particularly to hardware-implemented processing of database queries.

BACKGROUND OF THE INVENTION

Relational databases and Relational Database Management Systems (RDBMS) commonly use high level languages, such as SQL, having commands that manipulate tables, e.g., Join and Group-by. The Join command joins selected columns of two or more tables to create a new table. Joining is performed according to a common value or combination of values, referred to as a key. The SQL Join command has several variants, e.g., inner Join, full (or outer) Join, left Join and Right Join. The Group-by command groups together rows of a table according to a specified key.

Consider, for example, the following tables:

TABLE 1

| First name | Last name | Salary |
|---|---|---|
| John | Smith | 100 |
| Alice | Jones | 110 |
| Bob | Jones | 210 |
| John | Doe | 200 |

TABLE 2

| First name | Last name | City |
|---|---|---|
| John | Smith | New York |
| Alice | Jones | New York |
| Bob | Jones | London |
| John | Doe | London |
| Charlie | Brown | Paris |

TABLE 3

| City | Population | Altitude |
|---|---|---|
| New York | 100 | 1300 |
| London | 230 | 405 |

Applying Join to TABLE1 and TABLE2 according to "First name" and "Last name" produces the following table:

| First name | Last name | City | Salary |
|---|---|---|---|
| John | Smith | New York | 100 |
| Alice | Jones | New York | 110 |
| Bob | Jones | London | 210 |
| John | Doe | London | 200 |

Applying Join to TABLE2 and TABLE3 according to "City" produces the following table:

| First name | Last name | City | Altitude |
|---|---|---|---|
| John | Smith | New York | 1300 |
| Alice | Jones | New York | 1300 |
| Bob | Jones | London | 405 |
| John | Doe | London | 405 |

Applying Group-by to TABLE1 according to "First name" and averaging over Salary produces the following table:

| First name | Average (Salary) |
|---|---|
| John | 150 |
| Alice | 110 |
| Bob | 210 |

SUMMARY OF THE INVENTION

An embodiment of the present invention that is described herein provides an apparatus for applying database commands to one or more database tables. The apparatus includes a memory and a hardware-implemented pipeline. The hardware-implemented pipeline includes one or more table-processing circuits, and is configured to receive a stream of input records drawn from the one or more database tables, to parse first records, from among the input records, into a key and one or more fields other than the key, to store at least parts of the first records in the memory so as to be accessible using the key, and to apply a database command by matching at least parts of second records from among the input records to the at least parts of the first records stored in the memory, in accordance with the key.

In some embodiments, the database command is a Join command that joins at least parts of matching records from first and second input database tables, the first records are drawn from the first input database table, and the second records are drawn from the second input database table.

In an embodiment, at least one of the table-processing circuits is configured to apply the Join command by performing an insertion phase that stores the at least parts of the first input records in the memory, and a lookup phase, subsequent to the insertion phase, that joins matching at least parts of the first records and at least parts of the second records.

In another embodiment, for a given second record, at least one of the table-processing circuits is configured to retrieve from the memory at least parts of one or more first records having a key that matches the key of the given second record, and to produce one or more output records by joining at least part of the given second record and the respective at least parts of the one or more first records.

In some embodiments, the database command is a Group-by command that groups at least parts of matching records of a single database table, and both the first records and the second records are drawn from the single database table. In an example embodiment, at least one of the table-processing circuits is configured to apply the Group-by command by performing an aggregation phase that groups the matching records in the memory, and an output phase, subsequent to the aggregation phase, that outputs the grouped records. In a disclosed embodiment, in applying the Group-by command, at least one of the table-processing circuits is configured to, for each input record, check whether the memory already holds a matching entry, having a key that matches the key of the input record, when the memory does not already hold a matching entry, to create a new entry in the memory and store in the new entry at least part of the input record, and, when the memory already holds a matching entry, to update the matching entry in the memory to account for the input record. In an embodiment, the at least one of the table-processing circuits is configured to update the matching entry atomically. In an embodiment, the at least one of the table-processing circuits is configured to apply the Group-by command by scanning the single database table in a first order, and updating matching entries in the memory in a second order that is not constrained to follow the first order.

In some embodiments, when two or more of the first records correspond to a same key value, at least one of the table-processing circuits is configured to store in the memory two or more entries, which include at least parts of the two or more first records and are accessible by the same key value. In an example embodiment, the at least one of the table-processing circuits is configured to produce two or more output records corresponding to the two or more first records that match the same key value.

In some embodiments, for each first record, at least one of the table-processing circuits is configured to calculate a signature of the key of the first record and to store at least part of the signature in the memory in addition to the at least part of the first record. In a disclosed embodiment, the at least one of the table-processing circuits is configured to match at least part of a second record to at least part of a first record by (i) reading at least part of a first signature of the key of the at least part of the first record from the memory, and matching the read at least part of the signature to a second signature of the key of the least part of the second record, and (ii) only upon a match between the second signature and the at least part of the first signature, reading the key of the at least part of the first record from the memory and matching the read key to the key of the least part of the second record.

In some embodiments, for each first record, the at least one of the table-processing circuits is configured to calculate a substantially error-free hash over the key of the first record, to store the substantially error-free hash in the memory in addition to the at least part of the first record, and to match the at least parts of the second records to the at least parts of the first records by matching the substantially error-free hash of the second records to the substantially error free hash of the first records. In an embodiment, the at least one of the table-processing circuits is configured to store both the substantially error-free hash and the key in the memory. In another embodiment, the at least one of the table-processing circuits is configured to store the substantially error-free hash, but not the key, in the memory.

In some embodiments, for each first record, the at least one of the table-processing circuits is configured to calculate a hash over the key of the first record, and to store the at least part of the first record in the memory so as to be accessible according to a combination of both the hash and the key. In an example embodiment, in matching at least part of a second record to the at least parts of the first records, the at least one of the table-processing circuits is configured to access the memory by the hash, and then to identify, from among the at least parts of the first records that match the hash, the at least parts of the first records that also match the key.

In some embodiments, the database command is a Partition-by command, and one or more of the table-processing circuits are configured to perform a Group-by command, and then to perform a Join command on a result of the Group-by command. In other embodiments, the database command is a multi-dimensional Join command applied to three or more database tables, and one or more of the table-processing circuits are configured to perform the multi-dimensional Join command by performing multiple Join commands each applied to two database tables. In yet other embodiments, the database command is one of a Left-Join command, a Right Join command and an Outer-Join command, and at least one of the table-processing circuits is configured to mark input records that remained unmatched in execution of the database command, and to output the marked input records.

In some embodiments the apparatus further includes a controller, which is configured to execute the database command by streaming the input records via the pipeline in two or more phases, and reconfiguring at least one of the table-processing circuits in the pipeline between successive phases. In some embodiments the database command is a Count-Distinct command. In some embodiments at least one of the table-processing circuits includes a Coarse-Grain Reconfigurable Array (CGRA) processor. In some embodiments the apparatus further includes a controller, which is configured to allocate resources of the memory dynamically to the table-processing circuits.

In an embodiment, at least two of the input records, or at least two of the keys, differ in size from one another. In another embodiment, at least one of the table-processing circuits is configured to access the memory via an indirection table that is accessed by a hash value calculated over the key. In yet another embodiment, two or more of the table-processing circuits are configured to access a same memory. In still another embodiment, a given table-processing circuit is configured to divide one of the database tables into multiple buckets based on the key, and to apply the database command separately to each of the buckets.

In some embodiments, a given table-processing circuit includes a Processing Engine (PE) and a Lookup Engine (LE). In an embodiment, the PE is configured to pre-process data before providing the data to the LE, or to post-process data produced by the LE. In an embodiment, the table-processing circuits include a Processing Engine (PE) that is configured to selectably receive inputs or outputs from two or more Lookup Engines (LEs). Typically, the table-processing circuits are configured to apply the database command such that a given table-processing circuit processes each of the input records no more than once.

There is additionally provided, in accordance with an embodiment of the present invention, a method for applying database commands to one or more database tables. The method includes receiving a stream of input records, drawn from the one or more database tables, in a hardware-implemented pipeline including one or more table-processing circuits. Using the hardware-implemented pipeline (i) first records, from among the input records, are parsed into a key and one or more fields other than the key, and at least parts of the first records are stored in the memory so as to be accessible using the key, and (ii) a database command is applied by matching at least parts of second records from among the input records to the at least parts of the first records stored in the memory, in accordance with the key.

The present invention will be more fully understood from the following detailed description of the embodiments thereof, taken together with the drawings in which:

DETAILED DESCRIPTION OF EMBODIMENTS

Overview

Figure 1:
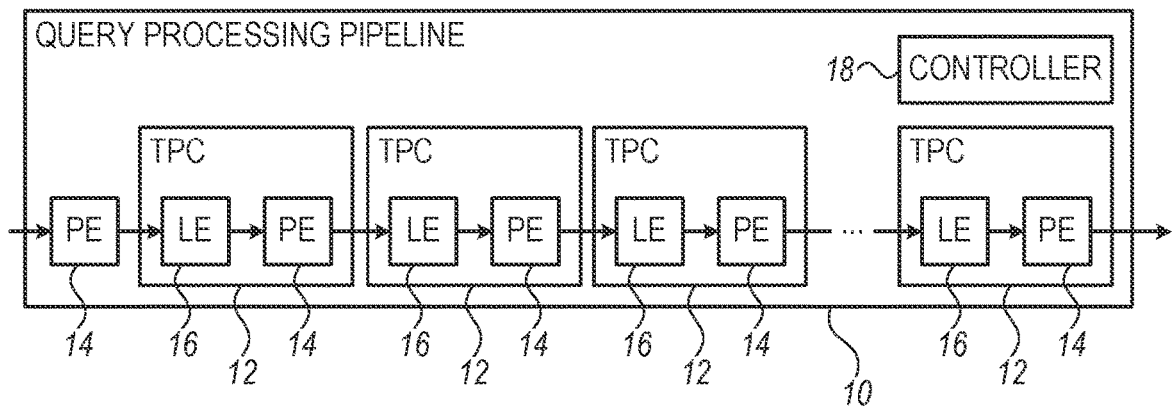
FIG. 1 is a block diagram that schematically illustrates a query processing pipeline, in accordance with an embodiment of the present invention.

Embodiments of the present invention that are described herein provide improved methods and systems for execution of database queries. In some embodiments, the disclosed techniques provide hardware circuitry for executing commands that manipulate database tables, such as Join, Group-by and others. The embodiments described herein refer mainly to queries that are formulated using the Structured Query Language (SQL), by way of example, but the disclosed techniques do not mandate any specific query format.

Some embodiments of the present invention use a basic hardware building block referred to as a Table Processing Circuit (TPC). The TPC typically comprises a Processing Engine (PE—also referred to as a processing circuit) and a Lookup Engine (LE—also referred to as a lookup circuit). Typically, although not necessarily, the LE performs the actual database command, and the PE pre-processes the data before it is provided to the LE, and/or post-processes the data produced by the LE.

A TPC is configured to carry out database commands, or parts thereof, that operate on two database tables (e.g., Join) or on a single database table (e.g., Group-by). In some embodiments, multiple TPCs are cascaded in a pipeline to perform more complex operations, as will be described in detail below. In a pipeline configuration, a given PE may pre-process the input for the LE of the same TPC (e.g., by operating on the output of a preceding TPC), or post-process the output of the LE of the same TPC (e.g., to provide output for a subsequent TPC). In some embodiments, any LE can add its lookup results to the record that flows along the pipeline, and therefore any subsequent PE in the pipeline (and not necessarily the next PE) may process these results. The number of LEs in the pipeline need not necessarily be equal to the number of PEs. For example, the pipeline may begin and end with a PE.

In some embodiments, a TPC is configured to perform a Join command between two tables in accordance with a specified key. The key comprises one or more fields (columns) that are common to the two tables, according to which the tables should be joined. The TPC performs the Join commands in two phases—An "insertion" phase followed by a "lookup" phase. In the insertion phase (which is more precisely a "lookup and conditional insertion" phase), the TPC scans the records (rows) of the first table and parses them into (i) a key and (ii) one or more other fields that should appear in the joined table (referred to as an "opaque"). The TPC looks-up the key in the memory, and optionally inserts the relevant fields of the parsed record in memory so as to be accessible by the key. In the lookup phase, the TPC scans the records of the second table. For each record of the second table, the TPC parses the record into a key and an opaque, retrieves any matching records of the first table (i.e., records having a matching key) from memory, and joins the appropriate fields from the matching rows of the two tables to produce joined records. The joined records are provided as output. As seen, the LE performs a Join command using only a single pass over the data.

Additionally or alternatively, a TPC may be configured to perform a Group-by command on a table, in accordance with a specified key and a specified grouping directive. The key comprises one or more fields (columns), according to which the grouping is to be performed. The grouping directive specifies how records that match the key are to be grouped. In an embodiment, the TPC scans the records of the table and parses them into a key and one or more other fields. For each record, the TPC checks whether the memory already holds an entry that matches the key. If not, the TPC creates a new entry in memory and stores the relevant fields from the currently-processed record in it. If an entry matching the key already exists in memory, the TPC updates the existing entry to account for the currently-processed record. For example, if the grouping directive specifies that a certain field is to be aggregated per key, the TPC reads the existing field value from memory, sums the existing field value and the field value of the currently-processed record, and writes the sum back to the memory, in place of the existing field value. When the TPC completes processing the last record, the memory holds the result, i.e., the Grouped-by table. Here, too, the TPC performs the command using only a single pass over the data.

In some embodiments, the same TPC is configurable to perform a Join command or a Group-by command. In both cases, the TPC receives a stream of input records drawn from one or two database tables (two tables when configured to perform Join, a single table when configured to perform Group-by). The TPC parses first records, from among the input records, into a key and one or more fields other than the key, and stores at least parts of the first records in the memory so as to be accessible by the key. The TPC applies the command by matching at least parts of second records from among the input records to the at least parts of the first records stored in the memory, in accordance with the key, so as to produce output records.

In some embodiments, the TPC stores records in memory by calculating a hash over the key, and storing the record in an address that is derived from the hash. Some disclosed techniques account for the small probability that different keys translate into the same hash. Such an event is problematic because matching of records (e.g., for joining tables or for grouping within a table) depends on an exact match of the key. Thus, in some embodiments the TPC uses a memory storage scheme that uses the hash as the initial pointer for storage, but still distinguishes between different keys that translate into the same hash.

In many practical scenarios, the key used for matching records is long, and therefore the matching operation incurs considerable memory-access bandwidth. In some embodiments, the TPC reduces its memory-access bandwidth by initially comparing signatures (e.g., CRCs) of the keys instead of the full keys. The full keys are compared only when a match is found between the signatures. Additionally or alternatively, the TPC may store in memory a highly-reliable hash that is substantially error-free (i.e., has an extremely low probability of hashing different keys into the same hash value), and identify matching records by comparing error-free hash values instead of full keys. In various embodiments described herein, the error-free hash is stored in addition to the key (thereby reducing memory-access bandwidth) or instead of the key (thereby reducing both memory-access bandwidth and memory space).

As noted above, in some embodiments multiple TPCs are cascaded to form a pipeline that executes more complex commands. Such commands may comprise, for example, multi-dimensional Join commands that manipulate more than two database tables, commands such as "Partition-by" that can be represented in terms of Join and Group-by commands, or queries that comprise multiple commands. Other examples are Intersect and Except commands. Generally, the pipeline operates on input records that are drawn from one or more database tables. In the present context, the term "input records drawn from a table" means that the input records are not necessarily the exact same records of the table (although they may be the same in some cases). Input records may comprise, for example, processed records, e.g., records having one or more added or modified fields. Additionally or alternatively, input records may comprise only a part of the corresponding original records of the table (i.e., containing only selected fields from the original table records).

In summary, the disclosed techniques provide hardware that executes database commands in a pipelined, streaming manner, with high throughput and a highly efficient use of memory.

Processing of Database Queries Using Pipelined Processing Engines and Lookup Engines FIG. 1 is a block diagram that schematically illustrates a hardware-implemented query processing pipeline 10, in accordance with an embodiment of the present invention. Pipeline 10 comprises one or more Table Processing Circuits (TPCs) 12, in the present example a cascade of multiple TPCs. Each TPC 12 comprises a respective Processing Engine (PE) 14 and a respective Lookup Engine (LE) 16. In the example of FIG. 1, the LE of each TPC precedes the respective PE. This order, however, is in no way mandatory, and is depicted in the figure purely for ease of explanation. Generally, as noted above, the PE in a given TPC may operate on the input and/or output of the respective LE. In the embodiment of FIG. 1, pipeline 10 begins with an "orphan" PE 14 that has no corresponding LE. By the same token, the TPCs could be drawn as having PEs that precede the LEs, and the pipeline may end with an "orphan" PE having no corresponding LE.

Pipeline 10 receives as input an SQL query, or part of a query, which comprises one or more commands that manipulates tables, e.g., Join or Group-by. A controller 18 configures (e.g., programs) the various PEs and LEs to perform their designated functions, so as to jointly execute the query. The pipeline then executes the query and provides the resulting table as output.

Typically, each table being processed is streamed into the pipeline only once, regardless of the number of SQL commands in the query. In other words, a given TPC 12 processes each of the input records no more than once. Due to the pipelined operation, pipeline 10 executes the SQL query with very high throughput.

The structure and operation of the LEs and PEs are explained in detail below. Additional details, examples and alternative implementations for the pipeline are given with reference to FIG. 9 further below. In the description that follows, most of the TPC operations are attributed to the LE. This choice, however, is made purely by way of example. In various embodiments, the operations performed by a TPC can be partitioned between the LE and PE in any suitable way.

Hardware Implementation of SQL Join

Figure 2A:
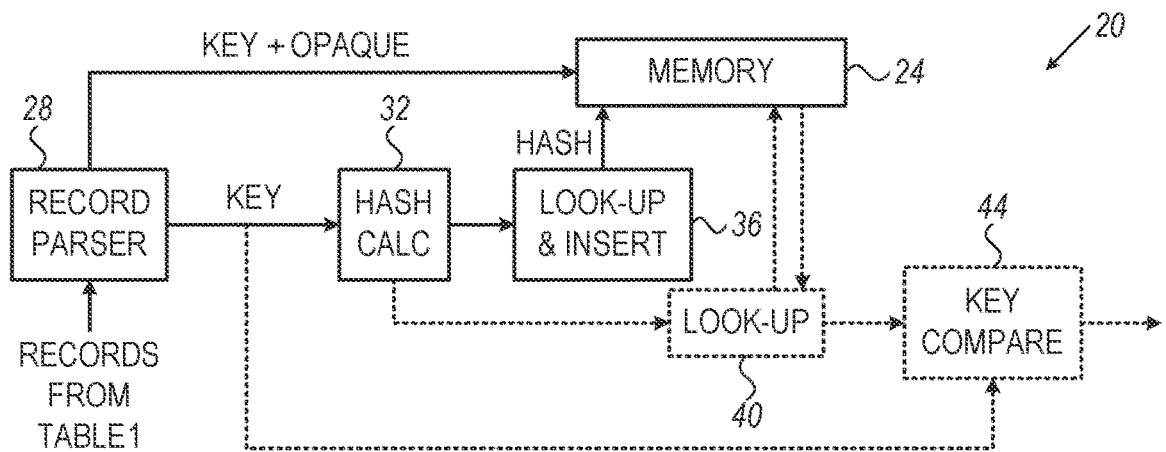
FIGS. 2A and 2B are block diagrams that schematically illustrate a Lookup Engine (LE) that carries out Join commands, in accordance with an embodiment of the present invention.
Figure 2B:
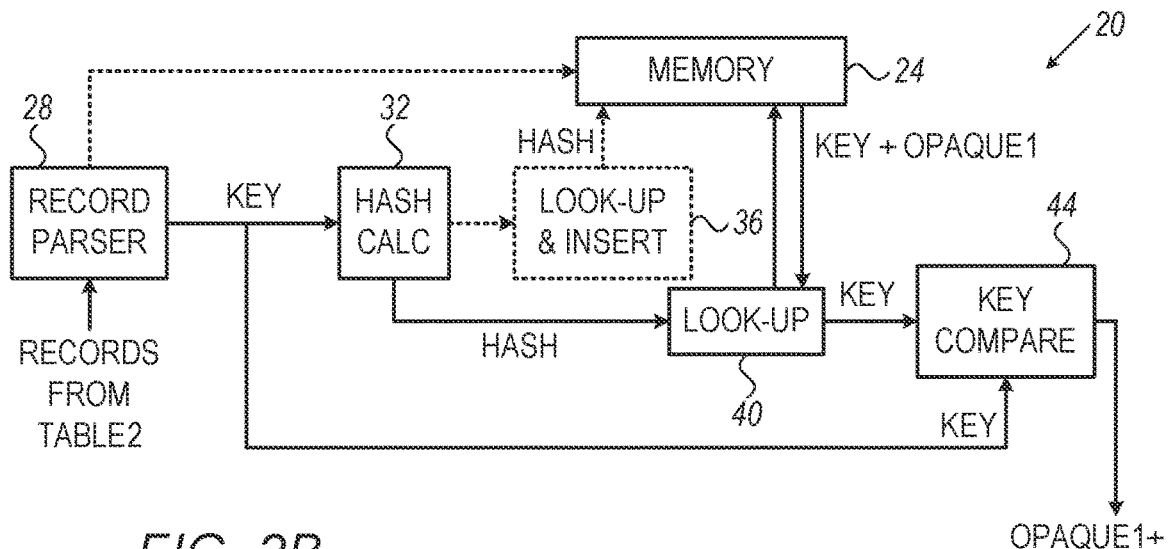
Figure 3:
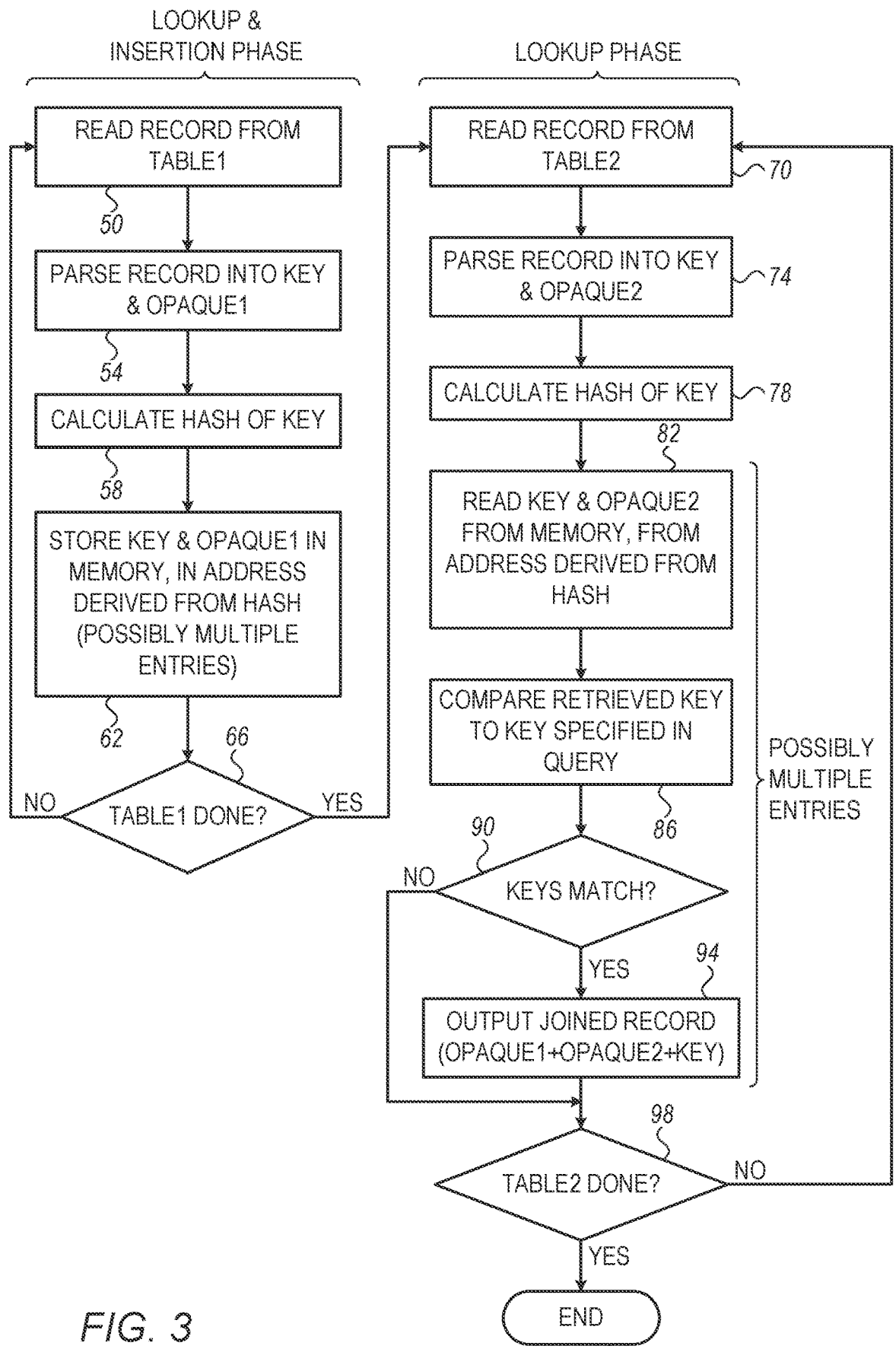
FIG. 3 is a flow chart that schematically illustrates a method for performing Join commands using the LE of FIGS. 2A and 2B, in accordance with an embodiment of the present invention.

FIGS. 2A, 2B and 3 are block diagrams and a flow chart illustrating a Lookup Engine (LE) 20 that carries out SQL Join commands, and a corresponding method, in accordance with an embodiment of the present invention. This LE configuration can be used, for example, for implementing some or all of LEs 16 in pipeline 10 of FIG. 1. The description that follows refers jointly to the three figures.

LE 20 is configured to perform SQL Join between two tables denoted TABLE1 and TABLE2. The Join command specifies the tables to be joined, and a key. The key comprises one or more columns that are common to the two tables, according to which the tables should be joined.

The process of joining the two tables in LE 20 comprises two phases—A lookup & insertion phase (referred to below simply as an insertion phase for brevity) followed by a lookup phase. The insertion phase is depicted in FIG. 2A and on the left-hand side of FIG. 3. The lookup phase is depicted in FIG. 2B and on the right-hand side of FIG. 3. In FIGS. 2A and 2B, elements of LE 20 that are inactive during a given phase are depicted with dashed lines.

In the insertion phase, LE 20 scans the records (rows) of TABLE1, parses them and stores the relevant fields in memory. In the lookup phase, LE 20 scans the records of TABLE2, parses them, retrieves corresponding fields of TABLE1 from memory, and joins the appropriate fields of TABLE1 and TABLE2 to produce joined records. The joined records are provided as output. (Throughout the description, when referring to tables, the terms "records" and "rows" are used interchangeably, and the terms "fields" and "columns" are used interchangeably.)

In the example of FIGS. 2A and 2B, LE 20 comprises a memory 24 for storing relevant information for the Join command, e.g., keys, field values, hash values, pointers and the like. LE 20 further comprises a record parser 28, a hash calculator 32, an insertion circuit 36, a lookup circuit 40 and a key comparator 44. Some of the elements of LE 20 are active only in the insertion phase, some are active only in the lookup phase, and others are active in both phases but may operate differently.

The insertion phase begins at a TABLE1 readout step 50 (FIG. 3), with record parser 28 reading a record (row) from TABLE1. The term "readout" in this context refers generally to any "pull" or "push" implementation for providing a record to parser 28. At a TABLE1 parsing step 54, parser 28 parses the record into a "Key" and an "Opaque" (denoted OPAQUE1). The key, as noted above, comprises the field or fields according to which the tables are to be joined. OPAQUE1 comprises one or more other fields of the record from TABLE1, which are not part of the key but which should appear in the joined record.

In some cases, in addition to the Key and Opaque, parser 28 also extracts from the record one or more fields that are defined as "Transparent". Transparent fields are not processed by the LE and are merely transferred onwards along the pipeline (e.g., because they serve part of the output or because they are intended for processing by a subsequent LE).

At an insertion hashing step 58, hash calculator 32 calculates a hash value over the key. Any suitable hash function can be used for this purpose. At an insertion step 62, insertion circuit 36 stores the key and the opaque (OPAQUE1) of the record in memory 24, in an address that is derived from the hash value.

Note that it is quite possible for TABLE1 to contain multiple records that will have the same key. Therefore, the storage scheme in memory 24 typically allows for storing multiple records that are addressed by the same key. Moreover, depending on the choice of hash function, there is some non-zero probability that two or more different keys will translate into the same hash value. Therefore, the storage scheme in memory 24 typically also allows for storing multiple records that are addressed by the same hash value but have different keys. A storage scheme that meets these requirements is described further below and depicted in FIGS. 4 and 5.

At an insertion completion checking step 66, LE 20 checks whether all records (rows) of TABLE1 have been scanned and processed. If not, the method loops back to step 50 above for reading the next row of TABLE1. Once all records of TABLE1 have been scanned, the method proceeds to the lookup phase. At this stage, memory 24 has been populated with the records of TABLE1 (or at least the fields that should appear in the joined table). The records of TABLE1 are stored in memory 24 in a manner that is addressable by HASH(KEY).

The lookup phase begins at a TABLE2 readout step 70, with record parser 28 of LE 20 reading a record (row) from TABLE2. At a TABLE2 parsing step 74, parser 28 parses the record into a key and an opaque (denoted OPAQUE2). The key is the same key used for insertion of TABLE1 to memory 24 in the insertion phase—The field or fields according to which the tables are joined. OPAQUE2 comprises one or more other fields of TABLE2, which are not part of the key but which should appear in the joined record.

At a lookup hashing step 78, hash calculator 32 calculates a hash value over the key, using the same hash function used in the insertion phase. At a lookup step 82, lookup circuit 40 accesses memory 24 using the hash value, and retrieves the record or records of TABLE1 that correspond to the hash value. In general, lookup circuit 40 may return multiple {KEY, OPAQUE1} entries.

For each {KEY, OPAQUE1} entry returned by lookup circuit 40, key comparator 44 compares the key (the key retrieved from memory 24) to the key parsed from the record of TABLE2, at a key comparison step 86 and a match checking step 90. If the two keys match, LE 20 constructs a joined record that comprises (i) the key, (ii) OPAQUE1 retrieved from memory 24, and (iii) OPAQUE2 parsed from the record of TABLE2, at a joining step 94. The joined record (which is a row of the joined table) is provided as output of LE 20. If the two keys do not match, comparator 44 discards the {KEY, OPAQUE1} entry in question. The key comparison mechanism ensures that, even though the hash value may correspond to multiple different keys, only OPAQUE1 and OPAQUE2 values that have the same key will be joined.

At a joining completion checking step 98, LE 20 checks whether all records (rows) of TABLE2 have been scanned. If not, the method loops back to step 70 above. Once all records of TABLE2 have been scanned, the method terminates.

In an embodiment, when joining two tables, LE 20 may choose the smaller table to serve as TABLE1 (which is parsed into memory 24) and the larger table to serve as TABLE2 (which is only used in the lookup phase). This choice reduced the required space in memory 24.

In an embodiment, the above process can be used for performing a "Left Join" or "Right Join" command. In a Left join, records in the left table that were not joined to any record of the right table are also provided as output. In an embodiment, to perform a Left Join, during the lookup phase, every record from Table 1 which is joined with a record from Table 2 is marked in memory by a respective "used" bit. Once all records of Table 2 have been scanned, an additional output stage outputs all records in memory whose "used" bit is not set. Similarly, in a Right Join, records in the right table that were not joined to any record of the left table should be output. Thus, to perform a Right Join, during the lookup phase, every record from Table 2 which is joined with a record from Table 1 is marked in memory by a respective "used" bit. Again, the output stage outputs all records in memory whose "used" bit is not set.

The method flow depicted in FIG. 3 is an example flow that is chosen purely for the sake of clarity. In alternative embodiments, any other suitable flow can be used. For example, the operation of key comparator 44 (and specifically the criteria for deciding when to output a record and when to discard a record) may vary. For example, the comparator may be set to be case-sensitive or case-insensitive as needed, according to the query.

In some embodiments, LE 20 carries out the insertion phase and/or the lookup phase over successive rows of the table being processed. In the insertion phase, for example, insertion circuit 36 may store the nth row of TABLE1 in memory 24, while at the same time hash calculator 32 calculates the hash of the key of the $(n+1)^{th}$ row of TABLE1, and at the same time parser 28 parses the $(n+2)^{th}$ row. In the lookup phase, insertion circuit 36 may join rows relating to the nth row of TABLE2, while at the same time hash calculator 32 calculates the hash of the key of the $(n+1)^{th}$ row of TABLE2, and at the same time parser 28 parses the $(n+2)^{th}$ row. In some embodiments, the LE may have a deeper pipelined structure, storing multiple rows in the same stage (in parser 28, hash calculator 32 or insertion circuit 36).

In some embodiments, when storing a record of TABLE1 in memory 24 (step 62), insertion circuit 36 calculates and stores a Cyclic Redundancy Check (CRC) of the key in along with the key itself. Alternatively to a CRC, any other suitable signature that is shorter than the key can be used. In the subsequent lookup phase, when attempting to match a record of TABLE2 with a record of TABLE1 (steps 86 and 94), lookup circuit 40 first compares the CRCs of the two keys. Only if the CRCs are found to match, the lookup circuit proceeds to compare the keys themselves. This technique is efficient because the key is often long (e.g., 512 bytes). Reading the complete key from memory is costly and time consuming in case of a mismatch. Instead, readout of the CRC (which is considerably shorter, e.g., 8 bits) is faster.

The probability of finding a match between CRCs but a mismatch between the keys is small (e.g., 255/256 in case of an 8-bit CRC).

Data Structures and Pointers in Lookup Engine

Figure 4:
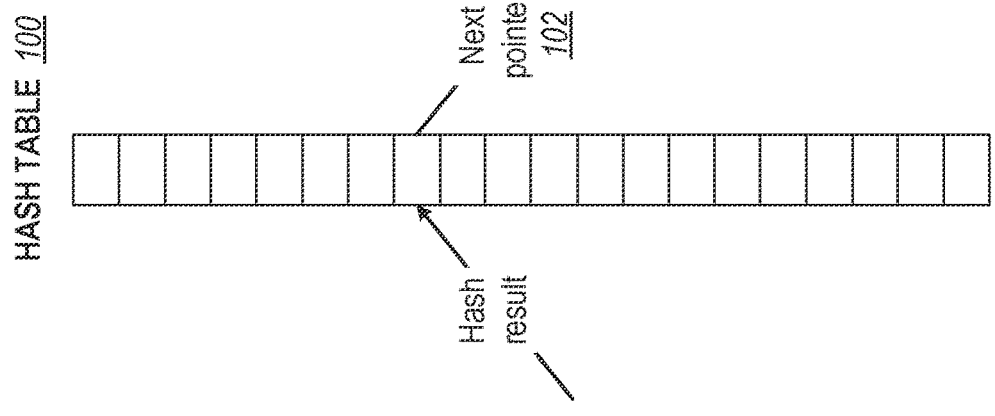

FIG. 4 is a diagram that schematically illustrates data structures used for storage in memory 24 of LE 20, in accordance with an embodiment of the present invention. In some embodiments, insertion circuit 36 of LE 20 populates these data structures with the records of TABLE1 during the insertion phase of an SQL Join operation (FIG. 2A and the left-hand side of FIG. 3). Subsequently, in the lookup phase of the SQL Join operation (FIG. 2B and the right-hand side of FIG. 3), lookup circuit 40 of LE 20 queries these data structures for joining records of TABLE1 with corresponding records of TABLE2. In other embodiments, the data structures are used in a similar manner in processing of other database commands.

As explained above, the storage scheme used by LE 20 supports storing of multiple records (rows) of TABLE1 that are addressed by the same hash value. The storage scheme also allows for the small probability of two or more different keys being mapped to the same hash value. Since joining of fields from TABLE1 and TABLE2 is based on a common key (as opposed to a common hash value), the storage scheme should distinguish between different keys that map to the same hash value, and not simply store all the records corresponding to the same hash value indiscriminately together.

Typically, the size and content of TABLE1 can vary, the numbers of entries in memory 24 (total number, as well as the number per key or per hash) is also unknown in advance. Therefore, to efficiently support variable numbers of entries, the storage scheme typically uses indirection.

In the embodiment of FIG. 4, memory 24 comprises a hash table 100 (also referred to as "indirection table") and a main table 104. Main table 104 comprises multiple entries. For ease of explanation, the entries that correspond to a certain hash value are referred to as a "region" of the main table. The regions are not necessarily contiguous. Each region stores the records of TABLE1 that correspond to the hash value. If a certain hash value can be derived from multiple different keys, then the region of this hash value is divided into sub-regions (which are not necessarily contiguous) associated with the different keys.

Hash table 100 is accessed by the hash values that are derived from the key by hash calculator 32. Each entry in hash table 100 holds a pointer 102 ("next pointer") that points into main table 104. Each pointer 102 points to the beginning of the region of table 104 that stores the records associated with the corresponding hash value. Thus, by accessing hash table 100 with a certain hash value, insertion circuit 36 or lookup circuit 40 can obtain a pointer 102 to the beginning of the region that holds the records associated with this hash value. In one embodiment, each entry in hash table 100 is three bytes in size (in case of a valid pointer 102), and holds a valid pointer or a NULL pointer (a hash value that is not mapped to any entry in table 104).

Each entry of main table 104 holds field values from a respective record of TABLE1 (e.g., key, OPAQUE1) and optionally other relevant information (e.g., CRC). In an embodiment, the key has a variable size, e.g., from four bytes up to 4 KB, and the OPAQUE has a variable size, e.g., up to 2 KB. In an embodiment, the number of fields (columns) stored in the entry, and their data sizes, are variable. The entry may also store a parameter indicative of the data size of the fields stored in the entry.

Figure 5:
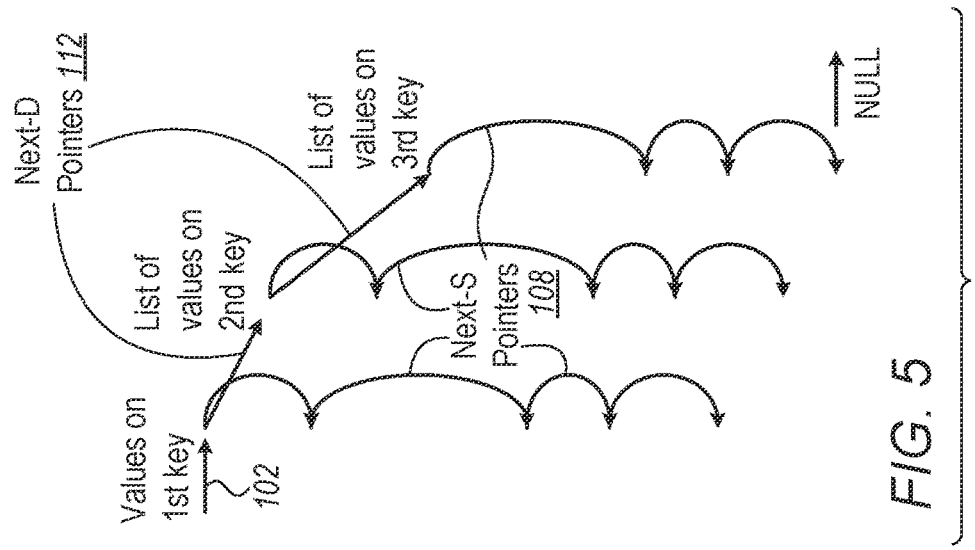
FIGS. 4 and 5 are diagrams that schematically illustrate data structures used for storage in the memory of the LE of FIGS. 2A and 2B, in accordance with an embodiment of the present invention.

In the embodiment of FIGS. 4 and 5, main table 104 is organized as multiple linked-lists, with two types of pointers (denoted "Next-S" and "Next-D") pointing between entries. A Next-S pointer points from one record to the next record in the same sub-region (i.e., within the same linked-list, to the next record corresponding to the same key as the present record). A Next-D pointer points from one linked-list to the next, i.e., from the first record in a sub-region to the first record in the next sub-region (which corresponds to a different key from the present record). The last record in a sub-region holds a NULL pointer. In one embodiment, each Next-S and Next-D pointer is three bytes in size and holds either a valid pointer or a NULL pointer.

This structure enables the LE to search the main table efficiently during the lookup phase. Typically, the LE first searches over the Next-D pointers until finding a matching key. Once a matching key is found, the LE proceeds to search over the Next-S pointers, in search of a matching hash value. Generally, however, the disclosed pointer structure is not mandatory, and table 104 may be implemented in any other suitable manner.

The multiple linked-lists shown in the example of FIGS. 4 and 5 all correspond to the same hash value (i.e., this entire structure is all pointed to by the same "next pointer" 102). Typically, each hash value (each entry in hash table 100) points to a similar structure that holds the records mapped to this hash value.

FIG. 5 is a diagram that schematically illustrates the various pointers used for storage in main table 104, in accordance with an embodiment of the present invention. The entire set of pointers shown in FIG. 5 begin with a certain "next pointer" 102, and therefore all correspond to the same hash value and the same region in table 104. Other regions in table 104, corresponding to other hash values and thus pointed-to by other "next pointers" 102, typically have a similar structure.

Vertical columns in FIG. 5 represent sub-regions of the region, i.e., to different keys derived from the hash value. In the present example, the hash value (corresponding to "next pointer" 102) can be derived from three different keys. Traversal along a given sub-region (traversal of records having the same key) is performed by following "Next-S" pointers 108. Traversal from one sub-region to the next (i.e., jumping to a sub-region corresponding to a different key) is performed by following "Next-D" pointers 112.

As noted above, the different regions and sub-regions in table 104 are not necessarily contiguous. For example, in some embodiments insertion circuit 36 populates table 104 in sequential order of scanning TABLE1. This order is typically not a sequential order in hash values. Nevertheless, the structure of "Next-S" pointers 108 and "Next-D" pointers 112 enables traversing between sub-regions and within sub-regions, so as to read or write records in their proper locations.

As can be appreciated, the storage scheme of FIGS. 4 and 5 does not require prior allocation of memory space to any specific region (hash value) or sub-region (key). As such, this scheme is flexible and makes efficient use of memory. Generally, different regions may differ in size from one another, and different sub-regions may differ in size from one another (and thus efficiently support tables having different numbers of records per hash value and/or key). Individual records, i.e., entries in table 104, may also differ in size from one another.

In some embodiments, when traversing table 104 over the Next-S pointers, the LE does not save the key in memory repeatedly, to save memory space.

The data structures, pointers and storage scheme shown in FIGS. 4 and 5 are chosen purely by way of example. In alternative embodiments, any other suitable data structures, pointers and storage scheme can be used.

In one embodiment, an additional table, referred to as "hash shortcut table" is used for reducing memory access bandwidth. The hash shortcut table comprises N bins, e.g., 64K bins. Each bin corresponds to a respective sub-range of hash value (and thus to a respective subset of entries of hash table 100). Each bin is set to "1" if at least one of the hash table entries in the corresponding subset is not empty. LE 20 may look-up the hash shortcut table before attempting to look-up table 100, and proceed to look-up table 100 only if the corresponding bin in the hash shortcut table is "1".

Hardware Implementation of SQL Group-by

Figure 6:
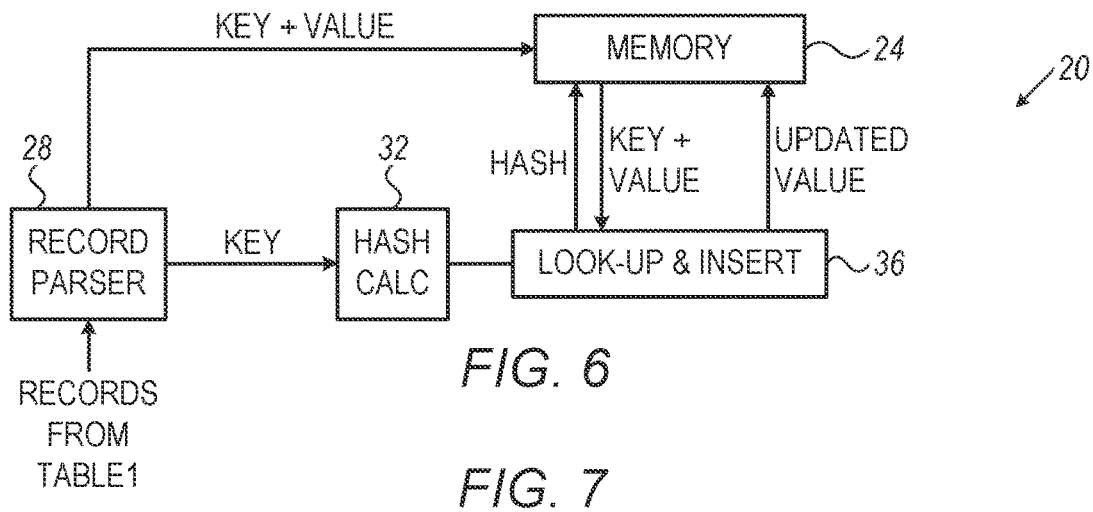
FIG. 6 is a block diagram that schematically illustrates a Lookup Engine (LE) that carries out SQL Group-by commands, in accordance with an embodiment of the present invention.
Figure 7:
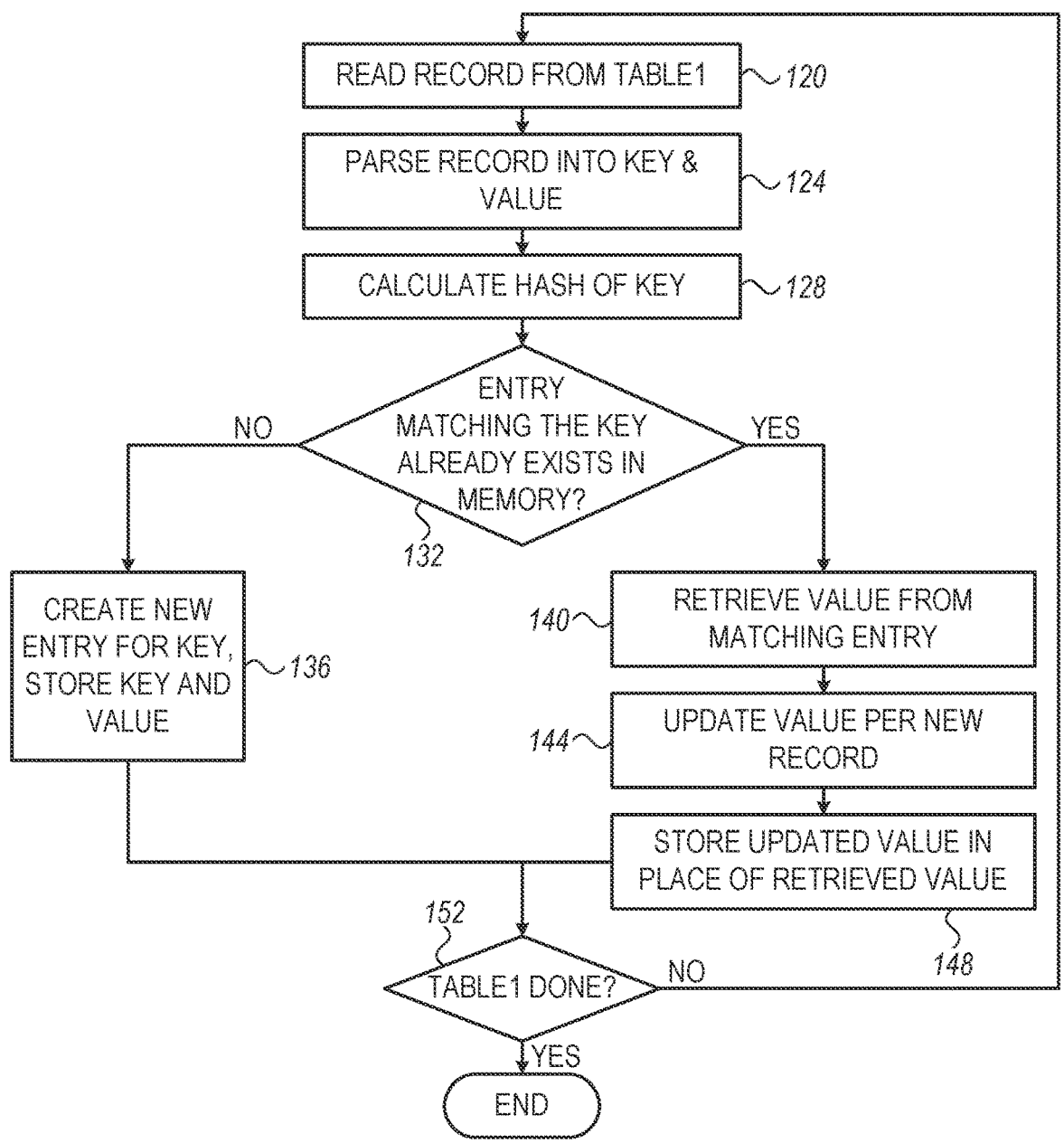
FIG. 7 is a flow chart that schematically illustrates a method for performing SQL Group-by commands using the LE of FIG. 6, in accordance with an embodiment of the present invention.

FIGS. 6 and 7 are a block diagram and a flow chart, which schematically illustrate LE 20 configured to carry out SQL Group-by commands, and a corresponding method, in accordance with an embodiment of the present invention. The description that follows refers jointly to the two figures. In some embodiments, the same LE 20 is reconfigured as needed to carry out SQL Join commands (as in FIGS. 2A and 2B) or SQL Group-by commands (as in FIG. 6). In particular, insertion circuit 36 operates differently in the two configurations.

In the present example, execution of a Group-by command begins at a TABLE1 readout step 120 (FIG. 7), with record parser 28 reading a record (row) from TABLE1. At a TABLE1 parsing step 124, parser 28 parses the record into a key and a value. At a hashing step 128, hash calculator 32 calculates a hash over the key.

At a checking step 132, insertion circuit 36 checks whether memory 24 already stores an entry that matches the hash. If no such entry is found, insertion circuit 36 creates a new entry in memory 24, at a new entry creation step 136. The new entry is addressed by the hash calculated at step 128, and comprises the key and the value parsed at step 124.

If, on the other hand, step 132 finds that memory 24 already has an entry that matches the hash, insertion circuit 36 performs a process (steps 140-148) that updates the existing entry to account for the value in the current row of TABLE1 being processed. At an existing value retrieval step 140, insertion circuit 36 retrieves the existing value from the entry. At an updating step 144, insertion circuit 36 updates the retrieved value based on the value of the current row of TABLE1 being processed. At an update storage step 148, insertion circuit 36 stores the updated value in the entry, in place of the previous value.

The specific updating operation (step 144) depends on the grouping directive specified in the Group-by command. For example, if the Group-by command specifies that the value is to be aggregated (summed) per key, insertion circuit 36 adds the new value to the value retrieved from the existing entry.

At a completion checking step 152, LE 20 checks whether all records (rows) of TABLE1 have been scanned and processed. If not, the method loops back to step 120 above for reading the next row of TABLE1. Once all records of TABLE1 have been scanned, the method terminates.

At the end of the process, the updated entries stored in memory 24 constitute the result of the Group-by command. The result may be streamed out of memory 24, or otherwise provided as output. In an embodiment, LE 20 streams the results from memory 24 to the output of the LE, in successive order of the rows of TABLE1.

The method flow depicted in FIG. 7 is an example flow that is chosen purely for the sake of clarity. In alternative embodiments, any other suitable flow can be used. For example, as noted above, one or more of the steps of FIG. 7 can be performed by a PE that is coupled to LE 20. In one example implementation, the PE performs steps 144 and 148.

In some embodiments, LE 20 carries out the method of FIG. 7 in parallel, or at least partially in parallel, for multiple rows of TABLE1. For example, parser 28, hash calculator 32 and insertion circuit 36 may operate in a pipelined manner. In a pipelined operation, insertion circuit 36 may update memory 24 based on the nth row of TABLE1, while at the same time hash calculator 32 calculates the hash of the key of the $(n+1)^{th}$ row of TABLE1, and at the same time parser 28 parses the $(n+2)^{th}$ row.

Moreover, insertion circuit 36 may process the rows of TABLE1 out of order (i.e., in an order that is different from the order in which the rows are read and parsed by parser 28). For example, readout from memory 24 (step 140) may be faster for some entries and slower for others due to different read latencies and/or different traversal paths over the linked list of main table 104 (FIGS. 4 and 5). In such a case, insertion circuit 36 may proceed to update the values (steps 144 and 148) for the faster entries while waiting for the readout results for the slower entries, causing out-of-order execution.

Nevertheless, for any given key, insertion circuit 36 performs the readout and updating process (steps 140-148) atomically. In other words, once the value corresponding to a certain key has been read (step 140), insertion circuit 36 will not start step 140 for other rows having the same key until updating (steps 144-148) is completed. This atomic operation is another reason for possible out-of-order execution.

Saving Memory Bandwidth and Memory Space Using Error-Free Hash

In some embodiments, LE 20 calculates and stores an "error-free hash value" of the key in each entry in memory 24. The term "error-free hash" refers to a hash in which the probability of two keys being mapped to the same hash value is negligible, wherein the definition of "negligible" depends on user requirements. In an example embodiment, the error-free hash is a 128-bit long crypto hash. Alternatively, however, other suitable hash functions can also be used.

The error-free hash is not to be confused with the hash calculated by hash calculator 32, or with the CRC mechanism described above. The CRC, as discussed previously, is typically short (e.g., 8 bits) and has a non-negligible probability (e.g., 1/256) of finding another key with the same hash. The hash calculated by hash calculator 32, too, has a non-negligible probability of corresponding to multiple keys, which is handled, for example, by the storage scheme and pointers of FIGS. 4 and 5.

When carrying out an SQL Join command (e.g., at step 90 of FIG. 3), LE 20 may use the error-free hash for matching rows of TABLE2 to entries in memory 24 (which are derived from rows of TABLE1), instead of comparing the full keys. When carrying out an SQL Group-by command (e.g., at step 132 of FIG. 7), LE 20 may use the error-free hash for matching rows of TABLE1 that should be grouped. Since the error-free hash is typically much shorter (i.e., has a considerably smaller number of bits) than the key, comparing error-free hash values instead of keys reduces the access bandwidth to memory 24.

In some embodiments, LE 20 stores both the error-free hash and the key in each entry in memory 24. In other embodiments, LE 20 stores the error-free hash, but not the key, in each entry in memory 24. Saving the error-free hash without the key saves memory space in addition to memory access bandwidth. Saving the error-free hash without the key in memory 24 is feasible in various use-cases, e.g., in Group-by commands, or in a Join command in which the key (or at least not the entire key) is not part of the output.

In some use-cases, e.g., in Group-by commands, the key may be needed as output even though LE 20 does not store it in memory 24. In an embodiment, LE 20 solves this problem by storing, for every new entry, the key and corresponding error-free hash in a separate memory location e.g., in an external Dynamic Random Access Memory (DRAM). Once the Group-by command is completed, LE 20 joins the two tables (the Grouped-by table in memory 24 and the table that links the keys to the respective hash values) according to the hash values. This joined table is provided as output.

Figure 8:
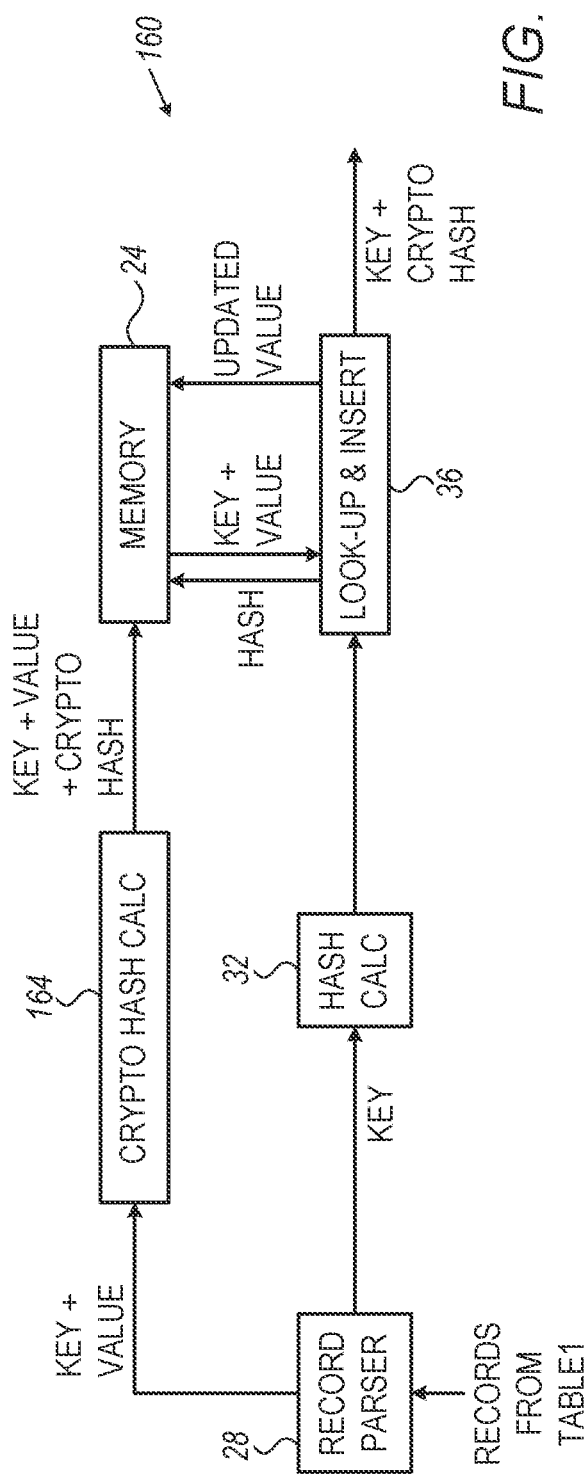
FIG. 8 is a block diagram that schematically illustrates a Lookup Engine (LE) that carries out SQL Group-by commands, in accordance with another embodiment of the present invention.

FIG. 8 is a block diagram that schematically illustrates a Lookup Engine (LE) 160 that carries out SQL Group-by using error-free hash, in accordance with another embodiment of the present invention. LE 160 is similar to LE 20 of FIGS. 2A and 2B, and additionally comprises a crypto-hash calculator 164. Calculator 164 calculates the error-free hash over the key as explained above. As noted above, this technique is not limited to crypto hash, and may use any other hash that is sufficiently reliable.

Processing of Database Queries Using Pipelined Processing Engines and Lookup Engines In some embodiments, LE 20 is preceded by a programmable Processing Engine (PE), also referred to as a processing circuit. The PE performs calculations or otherwise manipulates the keys and/or the values before providing them to the LE. Consider, for example, a Group-by command that specifies grouping by the sum of two fields. In an embodiment, the PE may perform the summation of the two fields for each row of TABLE1, and provide each row to LE 20 together with the sum. As another example, consider a Group-by command that specifies aggregation in the group by sum(field1>8), i.e., by the number of records in which field1>8. In this case, too, the calculation can be performed by the preceding PE instead of by the LE. The PE may also perform the aggregation itself and store the aggregation result in memory.

In some embodiments, multiple LEs can be pipelined in series, input-to-output, with at least some of them preceded by PEs. In an example embodiment, a processing pipeline comprises an interleaved cascade of PEs and LEs. This sort of pipeline can be used for executing complex queries, or parts of queries, that comprise multiple commands such as Join and Group-by commands.

Figure 9:
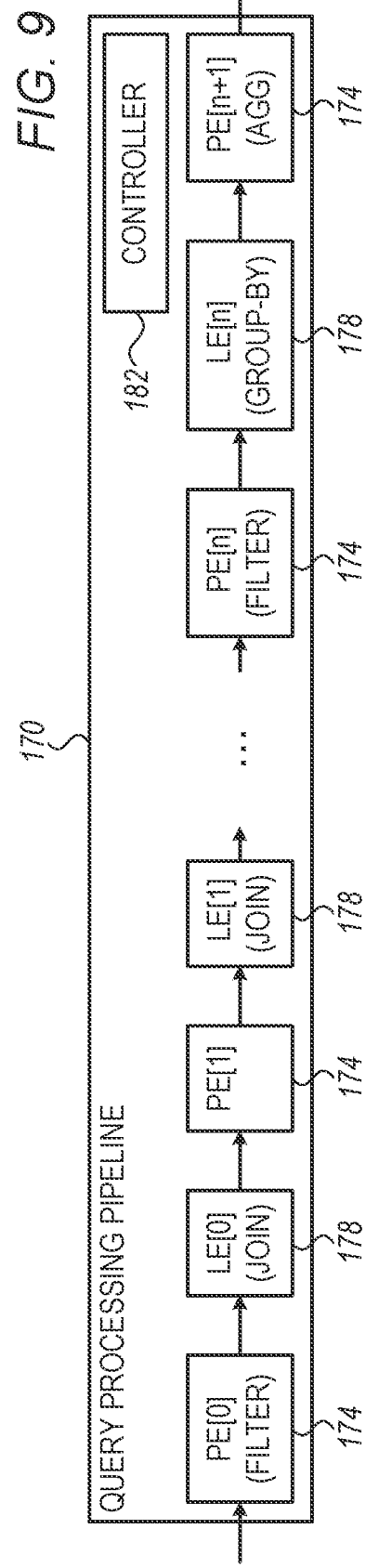
FIG. 9 is a block diagram that schematically illustrates a query processing pipeline, in accordance with an embodiment of the present invention.

FIG. 9 is a block diagram that schematically illustrates a hardware-implemented query processing pipeline 170, in accordance with an embodiment of the present invention. As noted above with respect to pipeline 10 of FIG. 1, pipeline 170 receives as input an SQL query, or part of a query, which comprises one or more commands that manipulates tables, e.g., Join or Group-by. The pipeline executes the query and provides the resulting table as output.

In the example of FIG. 9, pipeline 170 comprises multiple PEs 174 and multiple LEs 178, interleaved with one another. Generally, however, the order of PEs and LEs may not be purely interleaved, i.e., the pipeline may comprise two or more successive LEs and/or two or more successive PEs. In yet another embodiment, the pipeline may comprise multiple LEs that are coupled to a smaller number of PEs, wherein the pipeline interconnection scheme (e.g., allocation of PEs to selected LEs) is configured according to the query being performed.

LEs 178 may be implemented, for example, using any of the configurations described above, e.g., the configurations shown in FIGS. 2A, 2B and 6. In some embodiments, a controller 182 in the pipeline, or an external host (not shown in the figures), configures the various PEs and LEs to perform their designated functions in the pipeline.

In an embodiment, each pipeline stage (PE or LE) transfers records (table rows) to the next pipeline stage similarly to a network packet. Each pipeline stage can modify, add and/or remove columns from a record, drop a record or duplicate a record.

Each LE 178, as discussed at length above, is typically configured to carry out a key-value search in which a key is searched in an on-chip database (e.g., memory 24 of FIGS. 2A, 2B and 6). The lookup result (match or non-match) and the one or more values stored for the key (in case of a match) are provided as output of the LE. Various table manipulation commands, e.g., Join and Group-by, can be performed in this manner. Generally, the LE operation can be split into the following stages:

Key extraction from one or more columns in the input record.

Lookup using a hash-based table for relevant values (records) in memory.

Merging of zero, one or more match results (values) with the transparent part of the input record.

Each PE 174 is typically configured to process the input record before it is provided to the following pipeline stage (e.g., to a LE 178). PE 174 is typically configured to perform one or more of the following:

Filtering: Decide whether to drop or pass a record to the next pipeline stage.

Aggregation and updating of the aggregated result in memory: Process an input record and generate a value for aggregation (e.g., when the following LE performs Group-by). The actual aggregation operation is typically performed as an atomic operation on the memory (e.g., when the previous LE performed Group-by). The address of the aggregated values is part of the lookup response.

Update of columns in the output record—The output record may comprise columns that were generated or modified by the PE and can be used as a lookup key in the next lookup operation.

In some embodiments, the various LEs and PEs in the pipeline are capable of accessing the same memory. Memory resources may be allocated to the various LEs and PEs, e.g., on initialization of the pipeline. In other embodiments, memory resources can be allocated to a given LE or PE on-the-fly. For example, memory pages can be allocated to a LE during the insertion phase, in response to actual demand rather than in advance. Such memory allocation tasks are typically performed by controller 182.

In some embodiments, the structure of pipeline 170 enables execution of other SQL commands that can be expressed in terms of Join and Group-by commands. The SQL Partition-by command, for example, is equivalent to Group-by followed by Join.

Consider, for example a Partition-by command that partitions the following table by first name and average over salary:

TABLE 1

| First name | Last name | Salary |
|---|---|---|
| John | Smith | 100 |
| Alice | Jones | 110 |
| Bob | Jones | 210 |
| John | Doe | 200 |

In an embodiment, pipeline 170 may perform this command in two stages, but possibly by the same LE. First, one LE 178 in pipeline 170 performs Group-by by first name and average salary, to produce the following interim result:

| First name | Average (Salary) |
|---|---|
| John | 150 |
| Alice | 110 |
| Bob | 210 |

Then, a subsequent LE 178 in pipeline 170 performs Join between the interim result and the original TABLE1 according to First name, to produce the final result of the Partition-by command:

| First name | Last name | Salary |
|---|---|---|
| John | Smith | 150 |
| Alice | Jones | 110 |
| Bob | Jones | 210 |
| John | Doe | 150 |

As another example, pipeline 170 may perform a multi-dimensional Join command (i.e., a Join of multiple tables to a single table) by executing a sequence of Join commands (each Join command joining two tables) in multiple successive LEs 178. An example implementation of a multi-dimensional Join command in pipeline 170 is the following:
  Insert Table 1 to memory using a LE 178.
  Insert Table 2 to memory, using the same LE 178 or a different LE 178.
  Stream Table 3 through the pipeline. A certain LE 178 joins each record of Table 3 with Table 1. The resulting joined record continues to stream through the pipeline. A subsequent LE 178 joins the joined record with the associated record in Table 2. The result of the latter Join is a record that joined Table 1, Table 2 and Table 3. The process is repeated for all records of Table 3.

Another example is a Count-Distinct command. Yet another example is a Group-by followed by Count-Distinct, which may be implemented using two Group-by commands. Various other commands, or sequences of commands, can be implemented in this manner. Note that any such command involves only a single pass over the data, due to the pipelined operation of pipeline 170. Thus, potentially, the throughput of pipeline 170 can be one record per clock cycle.

In some embodiments, controller 182 reconfigured pipeline 170 on-the-fly. In this manner, pipeline 170 may process multiple sub-queries of a query in alternation, or otherwise process different high-level commands.

Memory Access and Caching Considerations

Typically, memory 24 of LE 20 or LE 160 (FIGS. 2A, 2B and 6) comprises internal, on-chip memory. In processing pipelines 10 and 170 (FIGS. 1 and 9) too, the memories of the various LEs 16 and 178 typically comprises internal, on-chip memory. Implementation using internal memory is important for achieving small latency and high throughput. In practice, however, the internal memory is limited in size and is too small for holding the entire tables and data structures being used.

Thus, in some embodiments LEs 16, 20, 160 and 178 use a suitable caching scheme. In a typical caching scheme, the entire data (e.g., database tables being processed) is stored in an external, off-chip memory system. The internal memory is used as a cache that caches a small portion of the data in accordance with some criterion (e.g., the most recently used data, or the most frequently used data). An eviction criterion is typically used to evict data from the internal memory (e.g., the least recently used data, or the least frequently used data).

In some embodiments, when scanning large tables (e.g., in executing a Join or Group-by command), LE 20 first "bucketizes" the tables, i.e., divides a table into multiple portions referred to as "buckets". The bucket size is typically set so that the result of processing each bucket (e.g., the grouped table produced by Group-by, or the smaller table in a Join) fits into the internal memory. The LE then scans one "bucket" at a time, and outputs the partial result for each bucket before proceeding to the next bucket.

In some embodiments, LE 20 divides a table into buckets while considering the key of the database command being executed. Typically, the LE ensures that all the records matching a given key fall in the same bucket. The LE typically uses its hash calculation capabilities for this operation. When meeting this condition (records that match the same key cannot fall in different buckets), applying the database command (e.g., Join or Group-by) to the records of a bucket is independent of the records of other buckets. Thus, a record has to be read only twice, regardless of the number of buckets. Moreover, merging the results of the command (e.g., Join or Group-by) from different buckets amounts to simply concatenating the results of the individual buckets.

In some embodiments, when bucketizing a given table, the LE (or the associated PE, or the pipeline controller) collects statistics that characterize the buckets (e.g., the number of records per bucket). The statistics enable improving subsequent bucketization operations.

In some embodiments, the LE may perform some of the filtering and aggregation specified in the query during the bucketization pass. This feature can reduce the amount of data stored in the buckets.

Other Embodiments and Variations

The configurations of pipelines 10 and 170 shown in FIGS. 1 and 9, of LEs 16, 20 and 160 shown in FIGS. 1, 2A, 2B and 6, and of their various components, are example configurations that are depicted purely for the sake of conceptual clarity. In alternative embodiments, any other suitable configurations can be used.

In various embodiments, pipeline 10 or 170, or an individual PE or LE, may receive its input from any suitable processor or host, e.g., from a higher-level processor that processes database queries. Similarly, pipeline 10 or 170, or an individual PE or LE, may provide its input to any suitable processor or host, e.g., to a higher-level processor that processes database queries. In some embodiments, pipeline 10 or 170, or an individual PE or LE, may be integrated in such a higher-level processor.

LEs 16, 20 and 160, pipelines 10 and 170 shown in FIGS. 1 and 9, and their various components, are typically implemented using suitable hardware, such as in one or more Application-Specific Integrated Circuits (ASIC) and/or one or more Field-Programmable Gate Arrays (FPGA). In some embodiments, certain parts of LEs 16, 20 and 160, pipelines 10 and 170 shown in FIGS. 1 and 9, and their various components, for example controllers 18 and 182, may be implemented using a programmable processor that is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

In some embodiments, one or more of the LEs and/or PEs of pipeline 10 and/or 170 may be implemented using a Coarse-Grain Reconfigurable Array (CGRA) processor. A CGRA processor typically comprises an array of compute nodes that are connected by a configurable fabric of interconnects. The compute nodes and interconnects are configured to execute a series of computing operations in accordance with a control flow graph. Example CGRA architectures and techniques are described, for example, in U.S. Pat. No. 10,579,390, in U.S. Patent Application Publication 2020/0159539, and in U.S. patent application Ser. Nos. 16/860,070, 16/889,159 and 17/015,275, whose disclosures are all incorporated herein by reference. The pipelined, graph-oriented nature of CGRA processors lends itself to efficient implementation of the elements of pipeline 170 (e.g., PEs 174).

In an example embodiment, the LEs of the pipeline are implemented using dedicated hardware blocks, while the PEs are implemented using fragments of a single CGRA. This implementation enables flexible, dynamic allocation of compute resources among the different pipeline stages.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. An apparatus for applying database commands to one or more database tables, the apparatus comprising:
   a memory; and
   a hardware-implemented pipeline comprising one or more table-processing circuits, at least one of the table-processing circuits in the pipeline being configured to perform a database Group-by command, which groups at least parts of matching records, by:
   receiving a stream of input records derived from the one or more database tables;
   parsing the input records into a key and one or more fields other than the key;
   calculating a signature of the key of each input record;
   performing an aggregation phase that groups matching records in the memory, including, for each input record:
   checking whether the memory already holds a matching entry, having a key that matches the key of the input record;
   when the memory does not already hold a matching entry, creating a new entry in the memory, and storing in the new entry at least part of the input record; and
   when the memory already holds a matching entry, updating the matching entry in the memory to account for the input record; and
   performing an output phase, subsequent to the aggregation phase, that outputs the grouped records.

2. The apparatus according to claim 1, wherein the at least one of the table-processing circuits is configured to update the matching entry atomically.

3. The apparatus according to claim 1, wherein the at least one of the table-processing circuits is configured to apply the Group-by command by scanning the one or more database tables in a first order, and updating matching entries in the memory in a second order that is not constrained to follow the first order.

4. The apparatus according to claim 1, wherein, for each input record, the at least one of the table-processing circuits is configured to store at least part of the signature in the memory in addition to the at least part of the input record.

5. The apparatus according to claim 4, wherein the at least one of the table-processing circuits is configured to check whether the memory already holds a matching entry by:
   reading from the memory a first signature of the key of a stored record, and matching the read first signature to a second signature of the key of a given input record; and
   only upon a match between the second signature and the first signature, reading the key of the stored record from the memory and matching the read key to the key of the given input record.

6. The apparatus according to claim 1, wherein, for each input record, the at least one of the table-processing circuits is configured to calculate a substantially error-free hash over the key of the first record, to store the substantially error-free hash in the memory in addition to the at least part of the input record, and to check whether the memory already holds a matching entry by matching the substantially error-free hash of one or more stored records to the substantially error free hash of the input record.

7. The apparatus according to claim 6, wherein the at least one of the table-processing circuits is configured to store both the substantially error-free hash and the key in the memory.

8. The apparatus according to claim 6, wherein the at least one of the table-processing circuits is configured to store the substantially error-free hash, but not the key, in the memory.

9. The apparatus according to claim 1, wherein, for each input record, the at least one of the table-processing circuits is configured to calculate a hash over the key of the input record, and to store the at least part of the input record in the memory so as to be accessible according to a combination of both the hash and the key.

10. The apparatus according to claim 9, wherein, in checking whether the memory already holds a matching entry, the at least one of the table-processing circuits is configured to access the memory by the hash, and then to identify, from among at least parts of one or more stored records that match the hash, at least stored record that also matches the key.

11. The apparatus according to claim 1, and comprising a controller, which is configured to execute the database Group-by command by streaming the input records via the pipeline in two or more phases, and reconfiguring at least one of the table-processing circuits in the pipeline between successive phases.

12. The apparatus according to claim 1, wherein at least one of the table-processing circuits comprises a Coarse-Grain Reconfigurable Array (CGRA) processor.

13. The apparatus according to claim 1, and comprising a controller, which is configured to allocate resources of the memory dynamically to the table-processing circuits.

14. The apparatus according to claim 1, wherein at least two of the input records, or at least two of the keys, differ in size from one another.

15. The apparatus according to claim 1, wherein at least one of the table-processing circuits is configured to access the memory via an indirection table that is accessed by a hash value calculated over the key.

16. The apparatus according to claim 1, wherein two or more of the table-processing circuits are configured to access a same memory.

17. The apparatus according to claim 1, wherein a given table-processing circuit is configured to divide one of the database tables into multiple buckets based on the key, and to apply the database Group-by command separately to each of the buckets.

18. The apparatus according to claim 1, wherein a given table-processing circuit comprises a Processing Engine (PE) and a Lookup Engine (LE).

19. The apparatus according to claim 18, wherein the PE is configured to pre-process data before providing the data to the LE, or to post-process data produced by the LE.

20. The apparatus according to claim 1, wherein the table-processing circuits comprise a Processing Engine (PE) that is configured to selectably receive inputs or outputs from two or more Lookup Engines (LEs).

21. The apparatus according to claim 1, wherein the table-processing circuits are configured to apply the database Group-by command such that a given table-processing circuit processes each of the input records no more than once.

22. A method for applying database commands to one or more database tables, the method comprising:
receiving a stream of input records, derived from the one or more database tables, in a hardware-implemented pipeline comprising one or more table-processing circuits; and
using at least one of the table-processing circuits in the hardware-implemented pipeline, performing a database Group-by command, which groups at least parts of matching records, by:
parsing the input records, into a key and one or more fields other than the key;
calculating a signature of the key of each input record;
performing an aggregation phase that groups matching records in the memory, including, for each input record:
checking whether the memory already holds a matching entry, having a key that matches the key of the input record;
when the memory does not already hold a matching entry, creating a new entry in the memory, and storing in the new entry at least part of the input record; and
when the memory already holds a matching entry, updating the matching entry in the memory to account for the input record; and
performing an output phase, subsequent to the aggregation phase, that outputs the grouped records.

23. The method according to claim 22, and comprising, for each input record, storing at least part of the signature in the memory in addition to the at least part of the input record.

24. The method according to claim 22, and comprising, for each input record, calculating a substantially error-free hash over the key of the input record, storing the substantially error-free hash in the memory in addition to the at least part of the input record, and checking whether the memory already holds a matching entry by matching the substantially error-free hash of one or more stored records to the substantially error free hash of the input records.

25. The method according to claim 22, and comprising, for each input record, calculating a hash over the key of the input record, and storing the at least part of the input record in the memory so as to be accessible according to a combination of both the hash and the key.

26. The method according to claim 22, wherein applying the database Group-by command is performed such that a given table-processing circuit processes each of the input records no more than once.

27. An apparatus for applying database commands to one or more database tables, the apparatus comprising:
a memory; and
a hardware-implemented pipeline comprising one or more table-processing circuits, at least one of the table-processing circuits in the pipeline being configured to perform a database Group-by command, which groups at least parts of matching records, by:
receiving a stream of input records derived from the one or more database tables;
parsing the input records into a key and one or more fields other than the key;
calculating a signature of the key of each input record; and
for each input record:
checking whether the memory already holds a matching entry, having a key that matches the key of the input record;
when the memory does not already hold a matching entry, creating a new entry in the memory, and storing in the new entry at least part of the input record; and
when the memory already holds a matching entry, updating the matching entry in the memory to account for the input record,
wherein the at least one of the table-processing circuits is configured to apply the Group-by command by scanning the one or more database tables in a first order, and updating matching entries in the memory in a second order that is not constrained to follow the first order.

28. An apparatus for applying database commands to one or more database tables, the apparatus comprising:
a memory; and
a hardware-implemented pipeline comprising one or more table-processing circuits, at least one of the table-processing circuits in the pipeline being configured to perform a database Group-by command, which groups at least parts of matching records, by:
receiving a stream of input records derived from the one or more database tables;
parsing the input records into a key and one or more fields other than the key;
calculating a signature of the key of each input record; and for each input record:

checking whether the memory already holds a matching entry, having a key that matches the key of the input record;

when the memory does not already hold a matching entry, creating a new entry in the memory, and storing in the new entry at least part of the input record; and when the memory already holds a matching entry, updating the matching entry in the memory to account for the input record, wherein, for each input record, the at least one of the table-processing circuits is configured to calculate a substantially error-free hash over the key of the first record, to store the substantially error-free hash in the memory in addition to the at least part of the input record, and to check whether the memory already holds a matching entry by matching the substantially error-free hash of one or more stored records to the substantially error free hash of the input record.

* * * * *